(12) United States Patent
Shufflebarger et al.

(10) Patent No.: US 6,805,024 B1
(45) Date of Patent: Oct. 19, 2004

(54) END PLAY RESTRICTION WEDGE

(75) Inventors: William S. Shufflebarger, Dayton, OH (US); Ned L. Kikly, Vandalia, OH (US); Jones C. Fung, Rochester, MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 35 days.

(21) Appl. No.: 09/974,096

(22) Filed: Oct. 9, 2001

(51) Int. Cl.[7] ............................................. F16H 55/24
(52) U.S. Cl. ..................................... 74/606 R; 49/324
(58) Field of Search .............................. 74/606 R, 422, 74/498, 424.6, 424.7, 425; 49/324

(56) References Cited

U.S. PATENT DOCUMENTS

| | | | | |
|---|---|---|---|---|
| 2,821,323 A | * | 1/1958 | Lee ............................. 220/233 |
| 3,525,365 A | * | 8/1970 | Meulendyk ................... 138/89 |
| 3,585,875 A | * | 6/1971 | Adams ......................... 74/392 |
| 3,774,981 A | * | 11/1973 | Kuck ........................... 384/251 |
| 3,825,146 A | * | 7/1974 | Hirmann ....................... 220/234 |
| 3,848,477 A | * | 11/1974 | Giandinoto et al. ........... 74/425 |
| 4,095,482 A | * | 6/1978 | Kirschner ..................... 74/498 |
| 4,187,035 A | * | 2/1980 | Colburn ....................... 403/218 |
| 4,318,573 A | * | 3/1982 | Hamman ...................... 384/192 |
| 4,365,524 A | * | 12/1982 | Dissett et al. ................ 475/226 |
| 4,448,088 A | * | 5/1984 | Adams ......................... 74/422 |
| 4,757,751 A | * | 7/1988 | Munoz ....................... 92/165 R |
| 4,867,333 A | * | 9/1989 | Kolp et al. ................... 220/234 |
| 5,089,736 A | * | 2/1992 | Oyafuso ....................... 310/90 |
| 5,160,226 A | * | 11/1992 | Lee, II ......................... 411/72 |
| 5,201,171 A | * | 4/1993 | Anderton et al. .............. 59/7 |
| 5,485,044 A | * | 1/1996 | Mackay et al. ................ 310/90 |
| 5,509,517 A | * | 4/1996 | Berenson et al. .............. 192/65 |
| 5,619,961 A | * | 4/1997 | Diggs ..................... 123/188.13 |
| 5,762,451 A | * | 6/1998 | Stankus et al. ............ 405/259.1 |
| 5,779,085 A | * | 7/1998 | Havlinek et al. ............. 220/234 |
| 5,794,326 A | | 8/1998 | Kikly .......................... 29/596 |
| 5,872,412 A | * | 2/1999 | Mita et al. .................... 310/83 |
| 5,904,436 A | * | 5/1999 | Maughan et al. ............ 403/140 |
| 5,924,326 A | * | 7/1999 | Fiedler et al. ................ 74/400 |
| 5,973,429 A | | 10/1999 | Swensgard et al. ........... 310/90 |
| 6,564,666 B1 | * | 5/2003 | Marcel ......................... 74/425 |

FOREIGN PATENT DOCUMENTS

EP     0 563 410 A1   *   3/1992
JP     58020561      *   2/1983

* cited by examiner

*Primary Examiner*—David A. Ducci
*Assistant Examiner*—Julie K. Smith
(74) *Attorney, Agent, or Firm*—J. Gordon Lewis

(57) ABSTRACT

An end play restriction wedge restricts the end play of a rotatable shaft with respect to a housing. The end play restriction wedge includes a female-wedge housing and a male wedge. The female-wedge housing has a U-shaped cross-section defined by an intermediate wall and outwardly extending side walls connected adjacent each end of the intermediate wall. The intermediate wall has a thrust plate surface along one side and an angled ramp along an opposite side. The angled ramp and outwardly extending side walls define a tapered aperture extending through the housing with an enlarged opening adjacent a first end of the housing. The male wedge is positioned adjacent the enlarged opening of the housing to be driven into the tapered aperture in response to an external force acting on an outer end of the wedge. The wedge has an angled camming surface engageable with the angled ramp after entering the aperture of the housing for driving the thrust plate surface toward the free end of the rotatable shaft to be engaged.

18 Claims, 2 Drawing Sheets

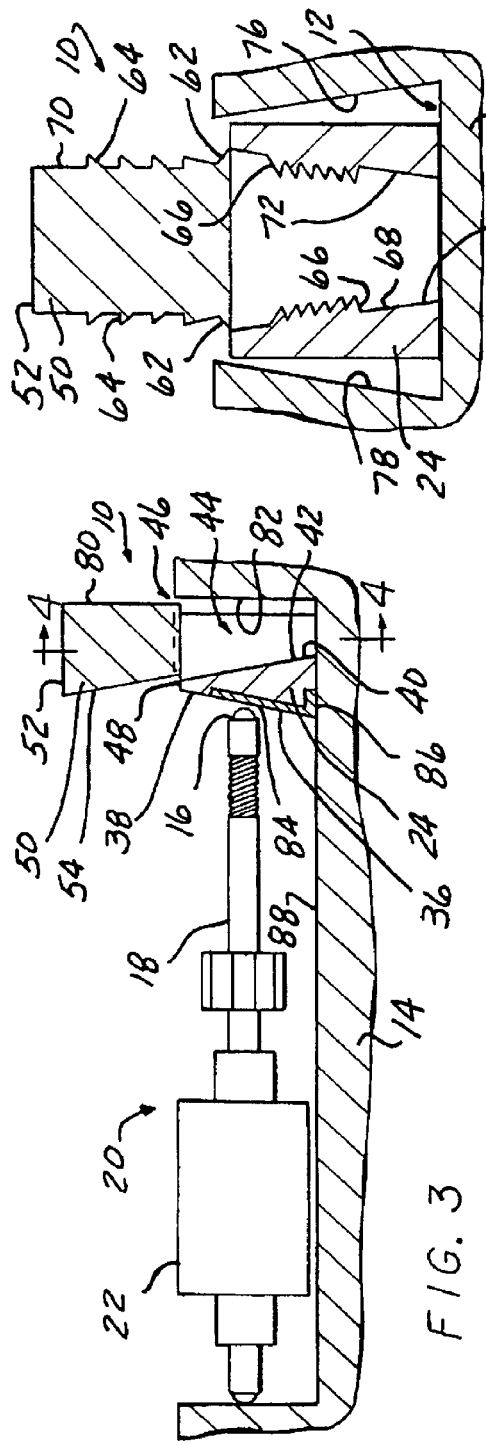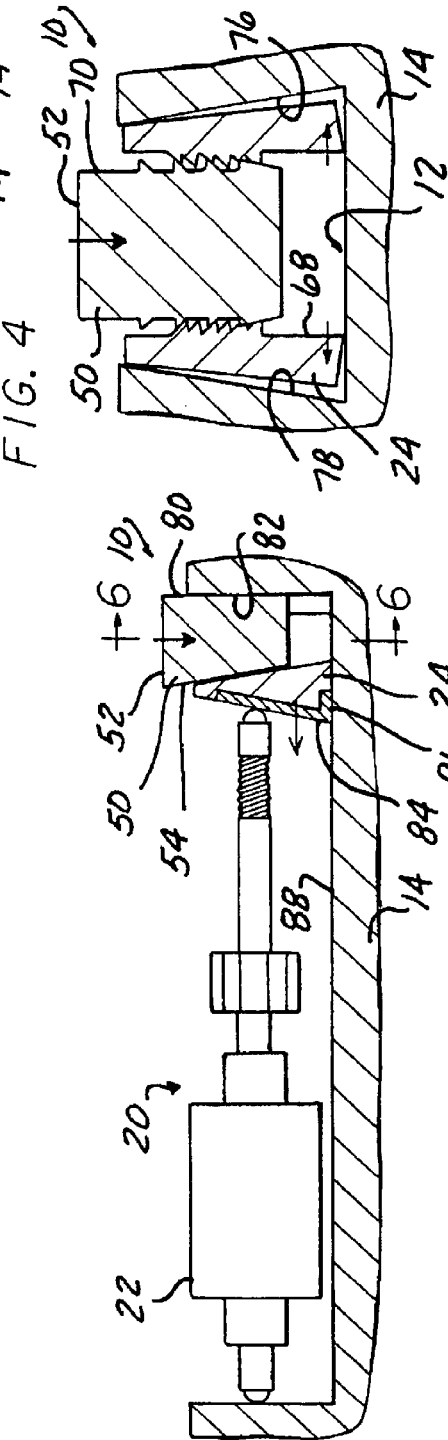

END PLAY RESTRICTION WEDGE

FIELD OF THE INVENTION

The present invention relates to a wedge for restricting the end play of a free-end of a rotatable shaft, and more particularly, a wedge for restricting the end play of a window lift motor.

BACKGROUND OF THE INVENTION

Window lift motors for motor vehicles typically have axial end play problems. Currently, screw-type corrections for axial end play are employed in the automotive industry. The screw-type mechanism can be subject to failure due to malformed, deformed, or damaged threads preventing the mechanism from eliminating the axial end play problem. The screw-type correction mechanism requires significant cost to form the multiple parts and to form the threads on the interacting components. In addition, the threaded interaction requires preassembly of the components prior to assembly into a final product.

SUMMARY OF THE INVENTION

The present invention provides a cost effective and robust solution to the window lift motor axial end play problems. The present invention provides enhanced motor durability and improved cost. The end play restriction wedge according to the present invention provides a female wedge housing in combination with a male wedge for carrying the axial thrust load in compression and requires no threads to operate. Interlocking teeth or serrations on both parts of the wedge retain the male wedge in an assembled position with respect to the female wedge housing. An angled thrust plate is mounted to the female wedge housing and trapped between the armature tip and a gear housing floor to prevent dislodging movement. The present invention provides substantial cost savings due to fewer number of components and by eliminating the need for preassembly of the components by the component supplier. The flexible wedge geometry according to the present invention eliminates tight tolerance dimensional requirements for the end play housing and gear housing pockets resulting in improved assembly compatibility.

The end play restriction wedge according to the present invention is a one piece plastic part with an insert molded metal thrust plate. The invention is intended to be installed inside the window lift actuator plastic gear housing after the armature and the motor housing are assembled. In operation, the male wedge is pushed down by an external force and breaks loose into the female tapered wedge housing. The female wedge housing wedges open to fill the back tapered gear housing pocket and advances forward to eliminate any excessive end play inside the motor assembly. The locking teeth, as well as the interference fit between the female wedge housing and the gear housing pocket, keep the end play assembly from coming loose during motor durability cycles.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 3 is a simplified cross sectional view of a housing enclosing a rotatable shaft having a free end opposite from a motor with an end play restriction wedge mounted within a reverse tapered pocket formed in the housing according to the present invention;

FIG. 4 is a cross sectional detailed view of the end play restriction wedge positioned within the reverse tapered pocket of the housing prior to wedging engagement of the male wedge portion with respect to the female wedge housing portion according to the present invention;

FIG. 5 is a simplified cross sectional view of the housing of FIG. 3 with the male wedge portion operably engaged within the female wedge housing portion according to the present invention; and FIG. 6 is a cross sectional detailed view of the end play restriction wedge according to the present invention with the male wedge portion operably engaged within the female wedge housing portion.

DESCRIPTION OF THE PREFERRED EMBODIMENT

Figure 1:
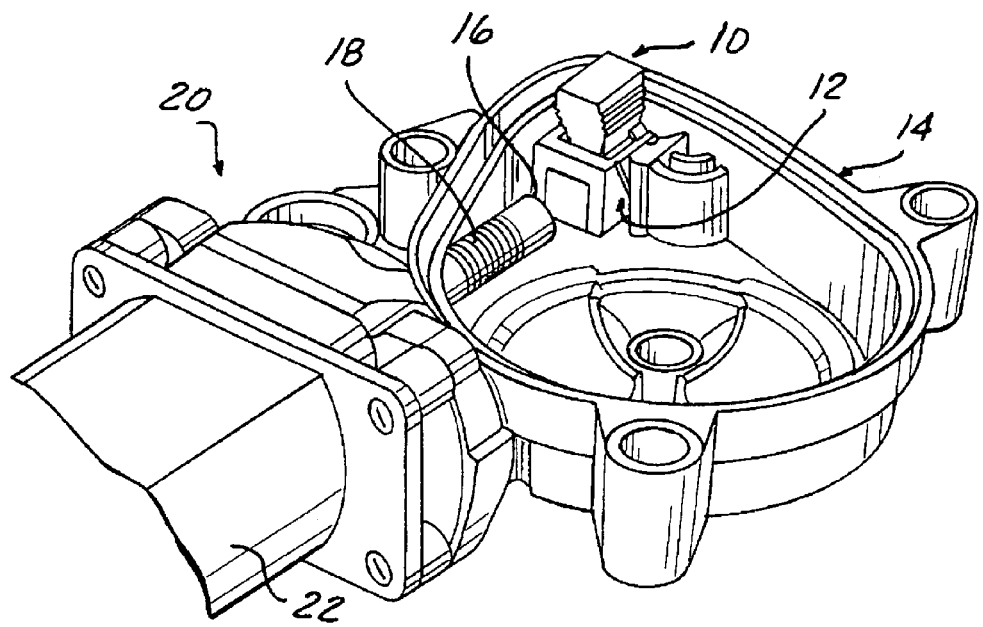
FIG. 1 is a simplified isometric view of a window lift drive assembly with various parts removed illustrating a motor attached to a housing having a reverse tapered pocket for receiving an end play restriction wedge according to the present invention.

Referring to FIG. 1, an end play restriction wedge 10 according to the present invention is operably engageable within a reverse or back tapered pocket 12 formed within a housing 14. The pocket 12 opposes a free end 16 of a rotatable shaft 18. While it is expected that the present invention will have a wide variety of applications for supporting the free end of rotatable shafts, the present invention is illustrated, by way of example and not limitation, in greater detail with respect to a window lift drive mechanism 20 having a motor 22 connected to the housing 14. The motion transmission assembly has been removed from the housing for purposes of clarifying the illustration of the present invention.

Referring now to FIGS. 1–6, the end play restriction wedge 10 according to the present invention includes a female-wedge housing 24 having a U-shaped cross-section defined by an intermediate wall 26 and two outwardly extending side walls 28, 30 integrally formed adjacent each end 32, 34 of the intermediate wall 26. The intermediate wall 26 includes a thrust plate surface 36 along one side 38 and an angled ramp 40, best seen in FIG. 3, along an opposite side 42. The angled ramp 40 and outwardly extending side walls 28, 30 define a tapered aperture 44 extending through the housing 24 with an enlarged opening 46 adjacent a first end 48 of the housing 24.

The end play restriction wedge 10 according to the present invention also includes a male wedge 50 positioned adjacent to the enlarged opening 46 of the housing 24 to be driven into the aperture 44 in response to an external force acting on an outer end 52 of the male wedge 50. Male wedge 50 includes an angled camming surface 54 engageable with the angled ramp 40 after entering the tapered aperture 44 of the housing 24 for driving the thrust plate surface 36 away from the male wedge 50.

Figure 2:
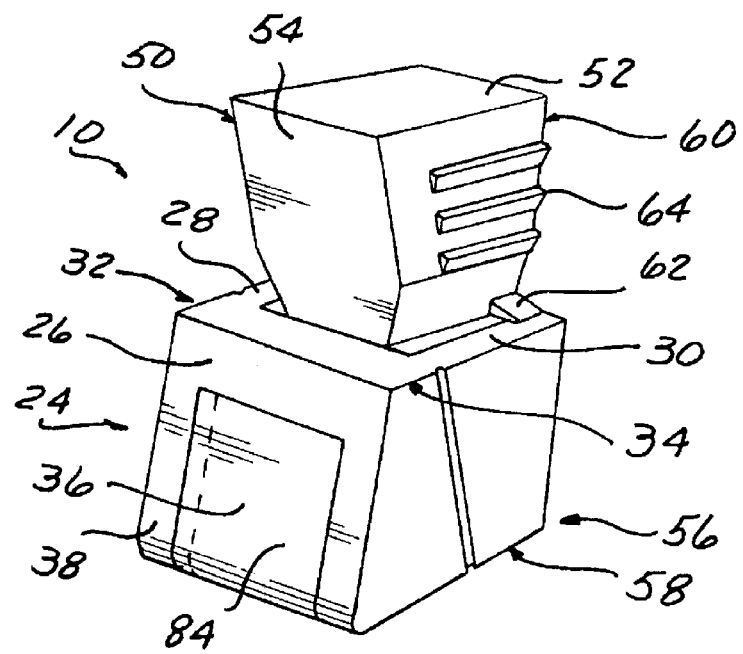
FIG. 2 is an isometric detailed view of the end play restriction wedge according to the present invention.

In the preferred configuration as best seen in FIG. 2, the end play restriction wedge 10 according to the present invention includes a unitary body 56 having a first portion 58 defined by the housing 24 and a second portion 60 defined by the male wedge 50. At least one breakable tab 62 connects the first portion 58 with respect to the second portion 60 of the unitary body 56 prior to application of an external force to the outer end 52 of the male wedge 50. Preferably, two tabs 62 connect opposite sides of the first portion 58 to opposite sides of the second portion 60 to form the unitary body 56. When an external force is applied to the outer end 52 of the male wedge 50, the tab 62 is broken separating the male wedge 50 from the housing 24 as the male wedge 50 enters the tapered aperture 44 formed in the housing 24 to drive the thrust plate surface 36 toward the free end 16 of the shaft 18.

Interlocking teeth or serrations 64, 66 are formed on at least one inner surface 68 of the housing 24 and at least one corresponding outer surface 70 of the male wedge 50 for holding the male wedge 50 in an engaged position, as illustrated in FIGS. 5–6, after being driven into the tapered aperture 44 of the female-wedge housing 24 by an external force applied to the outer end 52 of the male wedge 50. Preferably, the interlocking teeth 68, 70 are formed on opposite inner surfaces 68 of the housing 24 and on both corresponding outer surfaces 70 of the male wedge 50 as best seen in FIGS. 4 and 6. The interlocking teeth 64, 66 interact with one another to prevent dislodging or disengaging movement of the male wedge 50 with respect to the female-wedge housing 24. Preferably, the interlocking teeth or serrations 64, 66 are formed to permit inward movement of the male wedge 50 within the tapered aperture 44 of the female-wedge housing 24, while preventing outward movement of the male wedge 50 with respect to the female-wedge housing 24.

In the preferred configuration, best seen in FIGS. 4 and 6, the outwardly extending side walls 28, 30 of the female-wedge housing 24 include angled inner ramps 72, 74 engageable with opposite outer surfaces 70 of the male wedge 50 for driving the side walls 28, 30 outwardly as the male wedge 50 engages within the tapered aperture 44 formed in the female-wedge housing 24. The outward movement of the side walls 28, 30 engage the corresponding reverse tapered side walls 76, 78 of the pocket 12 formed in the housing 14. This motion simultaneously locks the female-wedge housing 24 with respect to the housing 14 while the thrust plate surface 36 is being driven into engagement to support the free end 16 of the shaft 18. The assembly is locked in position by the interaction between the interlocking teeth or serrations 64, 66 interposed between the male wedge 50 and the female-wedge housing 24. The side 80 of the male wedge 50 opposite from the angled camming surface 54 engages the back wall 82 of the pocket 12 formed in the housing 14 for driving the thrust plate surface 36 toward the free end 16 of the rotatable shaft 18 as best seen in FIGS. 3 and 5.

Preferably, the thrust plate surface 36 is formed of metal material. As best seen in FIGS. 2, 3, and 5, the thrust plate surface 36 is formed as a metal preform 84 insert molded into a single, unitary, monolithic body 56. In the preferred configuration, the metal preform 84 is formed with an angled, L-shaped cross section with one leg 86 engaged between the bottom surface 88 of the housing 14 and the intermediate wall 26 of the female-wedge housing 24. The leg 86 traps the thrust plate preform 84 between these two surfaces when the male wedge 50 is driven into the tapered aperture 44 of the female-wedge housing 24 and locked in place with the interlocking teeth 64, 66. This configuration prevents the thrust plate preform 84 from becoming loose with respect to the position in which the preform was insert molded with respect to the female-wedge housing 24.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for restricting end play of a rotatable shaft comprising:

a female-wedge housing having a U-shaped cross-section defined by an intermediate wall and two outwardly extending side walls connected adjacent each end of the intermediate wall, the intermediate wall having a thrust plate surface along one side to be engaged with an end of the rotatable shaft and an angled ramp along an opposite side, the angled ramp and outwardly extending side walls defining a tapered aperture extending through the housing with an enlarged opening adjacent a first end of the housing;

a male wedge positioned adjacent the enlarged opening of the housing to be driven into the aperture in response to an external force acting on the wedge, the wedge having an angled camming surface engageable with the angled ramp after entering the aperture of the housing for driving the thrust plate surface away from the male wedge;

a housing for supporting the shaft and a tapered aperture formed in the housing to receive the female-wedge housing; and a thrust plate mounted with respect to the female-wedge housing and engageable with the free end of the rotatable shaft, the thrust plate having an angled L-shaped cross-section with one leg engageable between a bottom surface of the housing and the female-wedge housing for maintaining the thrust plate in position with respect to the female-wedge housing after an external force has been applied to the male wedge.

2. The apparatus of claim 1 further comprising:

a unitary body having a first portion defined by the female-wedge housing and a second portion defined by the male wedge.

3. The apparatus of claim 2 further comprising:

at least one breakable tab connecting the first portion to the second portion of the unitary body prior to application of the external force to the male wedge.

4. The apparatus of claim 1 further comprising:

interlocking teeth formed on at least one inner surface of the female-wedge housing and at least one corresponding outer surface of the male wedge for holding the male wedge in an engaged position after driven into the female-wedge housing by the external force.

5. The apparatus of claim 1 further comprising:

the outwardly extending side walls of the female-wedge housing having angled inner ramps engageable with the male wedge for driving the side walls away from the male wedge as the male wedge engages within the aperture of the female-wedge housing.

6. The apparatus of claim 1 further comprising:

the thrust plate defined by a preform to be insert molded into a single, unitary, monolithic body with the female-wedge housing.

7. The apparatus of claim 1, wherein the male wedge defines single means for performing two simultaneous functions while being driven into the aperture in response to the external force acting on the male wedge, the single means for the female-wedge housing by driving the side wall outwardly and for the preloading the end of the rotatable shaft by driving the thrust plate surface toward engagement with the end of the rotatable shaft, the single means performing both functions in response to the application of the external force to the male wedge.

8. An apparatus for restricting end play of a rotatable shaft comprising:

a single, unitary, monolithic body having a first portion and a second portion, the first portion defined by a female-wedge housing having a U-shaped cross-section defined by an intermediate wall and two outwardly extending side walls connected adjacent each end of the intermediate wall, the intermediate wall having a thrust plate surface along one side to be engaged with an end of the rotatable shaft and an angled ramp along an opposite side, the angled ramp and outwardly extending side walls defining a tapered aperture extending through the housing with an enlarged opening adjacent a first end of the housing, the second portion defined by a male wedge positioned adjacent the enlarged opening of the housing to be driven into the aperture in response to an external force acting on the wedge, the wedge having an angled camming surface engageable with the angled ramp after entering the aperture of the housing for driving the thrust plate surface away from the male wedge, and breakable means for temporarily connecting the first portion to the second portion of the unitary body prior to application of the external force to the male wedge;

a housing for supporting the shaft and a tapered aperture formed in the housing to receive the female-wedge housing; and a thrust plate mounted with respect to the female-wedge housing and engageable with the free end of the rotatable shaft, the thrust plate having an angled L-shaped cross-section with one leg engageable between a bottom surface of the housing and the female-wedge housing for maintaining the thrust plate in position with respect to the female-wedge housing after an external force has been applied to the male wedge.

9. The apparatus of claim 8 further comprising:

interlocking teeth formed on at least one inner surface of the female-wedge housing and at least one corresponding outer surface of the male wedge for holding the male wedge in an engaged position after being driven into the female-wedge housing by the external force.

10. The apparatus of claim 8 further comprising:

the outwardly extending side walls of the female-wedge housing having angled inner ramps engageable with the male wedge for driving the side walls away from the male wedge as the male wedge engages within the aperture of the female-wedge housing.

11. The apparatus of claim 8 further comprising:

the thrust plate defined by a perform to be insert molded into a single, unitary, monolithic body with the female-wedge housing.

12. The apparatus of claim 8, wherein the male wedge defines single means for performing two simultaneous functions while being driven into the aperture in response to the external force acting on the male wedge, the single means for securing the female-wedge housing by driving the side walls outwardly and for preloading the end of the rotatable shaft by driving the thrust plate surface toward engagement with the end of the rotatable shaft, the single means performing both functions in response to the application of the external force to the male wedge.

13. An apparatus for restricting end play of a rotatable shaft comprising:

a female-wedge housing having a U-shaped cross-section defined by an intermediate wall and two outwardly extending side walls connected adjacent each end of the intermediate wall, the intermediate wall having a thrust plate surface along one side to be engaged with an end of the rotatable shaft and an angled ramp along an opposite side, the angled ramp and outwardly extending side walls defining a tapered aperture extending through the housing with an enlarged opening adjacent a first end of the housing;

a male wedge positioned adjacent the enlarged opening of the housing to be driven into the aperture in response to an external force acting on the wedge, the wedge having an angled camming surface engageable with the angled ramp after entering the aperture of the housing for driving the thrust plate surface away from the male wedge;

locking means, formed on at least one inner surface of the female-wedge housing and at least one corresponding outer surface of the male wedge, for holding the male wedge in an engaged position after being driven into the female-wedge housing by the external force;

a housing for supporting the shaft and a tapered aperture formed in the housing to receive the female-wedge housing; and a thrust plate mounted with respect to the female-wedge housing and engageable with the free end of the rotatable shaft, the thrust plate having an angled L-shaped cross-section with one leg engageable between a bottom surface of the housing and the female-wedge housing for maintaining the thrust plate in position with respect to the female-wedge housing after an external force has been applied to the male wedge.

14. The apparatus of claim 13 further comprising:

a unitary body having a first portion defined by the female-wedge housing and a second portion defined by the male wedge.

15. The apparatus of claim 14 further comprising:

at least one breakable tab connecting the first portion to the second portion of the unitary body prior to application of the external force to the male wedge.

16. The apparatus of claim 13 further comprising:

the outwardly extending side walls of the female-wedge housing having angled inner ramps engageable with the male wedge for driving the side walls away from the male wedge as the male wedge engages within the aperture of the female-wedge housing.

17. The apparatus of claim 13 further comprising:

the thrust plate defined by a preform to be insert molded into a single, unitary, monolithic body with the female-wedge housing.

18. The apparatus of claim 13, wherein the male wedge defines single means for performing two simultaneous functions while being driven into the aperture in response to the external force acting on the male wedge, the single means for securing the female-wedge housing by driving the side walls outwardly, and for preloading the end of the rotatable shaft by driving the thrust plate surface toward engagement with the end of the rotatable shaft, the single means performing both functions in response to the application of the external force to the male wedge.

* * * * *